United States Patent [19]

Ebenhofer et al.

[11] Patent Number: 5,030,076
[45] Date of Patent: Jul. 9, 1991

[54] INJECTION DIE FOR INJECTING TWO COMPONENTS

[75] Inventors: Karl Ebenhofer, Perg; Fredrick Kühberger, Saxen; Leo Sturm, Schwertberg, all of Austria

[73] Assignee: Engel Maschinenbau Gesellschaft m.b.H., Schwertberg, Austria

[21] Appl. No.: 619,668

[22] Filed: Nov. 28, 1990

Related U.S. Application Data

[63] Continuation of Ser. No. 407,349, Sep. 14, 1989, abandoned.

[30] Foreign Application Priority Data

Sep. 19, 1988 [AT] Austria .............................. 2284/88

[51] Int. Cl.⁵ .............................................. B29C 45/23
[52] U.S. Cl. ................................... 425/130; 264/241; 264/328.8; 264/572; 425/562; 425/564
[58] Field of Search ................. 425/130, 131.1, 132, 425/133.1, 133.5, 523, 528, 532, 533, 535, 536, 562, 564, 563, 146, 566; 264/572, 241, 245, 328.8

[56] References Cited

U.S. PATENT DOCUMENTS

| | | | |
|---|---|---|---|
| 3,888,612 | 6/1975 | Schrewe et al. | 425/130 |
| 3,947,175 | 3/1976 | Melcher | 425/130 |
| 4,117,955 | 10/1978 | Sokolow | 425/130 |
| 4,140,672 | 2/1979 | Kataoka | 264/328.7 |
| 4,333,608 | 6/1982 | Hendry | 425/146 |
| 4,781,554 | 11/1988 | Hendry | 425/130 |

FOREIGN PATENT DOCUMENTS

| | | |
|---|---|---|
| 2342789 | 3/1975 | Fed. Rep. of Germany . |
| 2445112 | 3/1975 | Fed. Rep. of Germany . |
| 2623308 | 12/1977 | Fed. Rep. of Germany . |
| 1219097 | 1/1971 | United Kingdom . |
| 1332883 | 10/1973 | United Kingdom . |

Primary Examiner—Timothy Heitbrink
Attorney, Agent, or Firm—Notaro & Michalos

[57] ABSTRACT

An injection molding die for an injection molding machine is capable of injecting a plurality of plastic components or one plastic component and a gas or liquid, selectively or simultaneously. The molding die includes a die base with a die channel which slidably receives a sleeve element. An injection aperture in the die channel can be closed or opened by the sleeve element. A pin channel in the sleeve element receives a closing pin which is fixed to the die base. A passage opening in the sleeve element can be closed or opened by relative movement between the sleeve element and the closing pin. A lever arrangement extends laterally from the sleeve element for moving the sleeve element in the die channel.

11 Claims, 4 Drawing Sheets

INJECTION DIE FOR INJECTING TWO COMPONENTS

This application is a continuation of application Ser. No. 407,349, filed Sept. 14, 1989, now abandoned.

FIELD AND BACKGROUND OF THE INVENTION

The present invention relates to an injection molding die of an injection molding machine for the production of injection molded pieces made up of several plastic components, and for the production of hollow injection molded pieces, the die having a die base and an injection aperture, a sleeve element axially displaceable in the die base with a conical orifice and a closing pin or needle protruding into the sleeve element.

Austrian patent 342,287 discloses a method for the production of a shaped part by injection molding where two different plastic materials are injected from two cylinders into a common mold, so that an injection molded piece is obtained which comprises an outer layer and a core material. Here the die is designed as a two-way valve and is switchable in such a way that plastic material can be injected into the molding tool (die) either from one or from the other injection cylinder.

Similar methods are described in British patents 1,219,097 and 1,332,883.

German patent application OS 2,342,789 discloses an apparatus for intermittent production of multi-layer shaped bodies in which there are provided in the die base, an axially displaceable sleeve and inside the sleeve, an axially displaceable closing pin. By means of this apparatus, injection molded pieces consisting of different plastic components can also be produced.

German patent application OS 2,445,112, too, shows an injection molding die which is connected to three plasticizing cylinders and which has displaceable sleeves which alternately clear or shut off a die channel.

It is also known to inject a gas, generally nitrogen, into the mold during the injection molding process, in order thus to create an injection molded piece with cavities, whereby plastic material can be saved.

SUMMARY OF THE INVENTION

It is an object of the present invention to provide an injection molding die of the initially mentioned kind with which two plastic components or one plastic component and a gas can be supplied selectively to a mold, and which is outstanding for its simple design and requires fewer movable parts than known apparatus of this kind.

The problem of simplifying the apparatus is solved in that the closing pin is arranged to be immovable in the die base at a constant distance from the injection aperture, while the sleeve element is displaceable over the distance between the injection aperture and the tip of the closing pin.

Advantageously, the closing pin and the sleeve element define an annular channel and the annular channel is connected to a gas or liquid feed line. In this way, depending on the position of the sleeve element, either plastic can be injected from the die (nozzle) or gas or liquid can be admitted into the tool (die). If the annular channel between the closing pin and the die base is dimensioned accordingly, it is possible also to supply a second plastic component to the injection aperture.

Displacement of the sleeve element occurs advantageously through a laterally engaging lever.

To obtain better guiding of the sleeve element, the closing pin is advantageously provided at its circumference, with radially projecting axially spaced guiding knobs for the sleeve element.

In one embodiment of the invention, the gas feed line protrudes laterally into the sleeve element and participates in the axial displacement thereof.

Advantageously the sleeve element is guided in a guide member delimiting a front die chamber and having passage channels for the plasticized plastic, the passage channels continuing through the die base and connecting the front die chamber with a rear die chamber which connects to the screw cylinder.

In another embodiment of the invention, the die base is fixable in a middle position between the injection aperture and the tip of the closing pin.

It is thereby possible to inject two plastic components into the mold simultaneously, or to simultaneously inject a plastic and a gas or liquid.

According to another embodiment of the invention, the sleeve element is provided with a lateral opening which permits passage of plastic compound into the central channel of the sleeve element, and two side channels whose outlet openings are offset in the displacement direction of the sleeve element and open into the die channel in which the sleeve element is located.

In this manner, a two-component injection molding die which is extremely safe to operate is obtained at a relatively low cost of construction.

To permit the simultaneous injecting of the two plastic components in such an injection molding die, in a further embodiment of the invention the sleeve element has, at its convex surface, a flattened portion or notch in the region of the outlet opening of the front side channel.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the following, two embodiments of the invention will be described in detail with reference to the drawings wherein.

DESCRIPTION OF THE PREFERRED EMBODIMENTS

Figure 1:
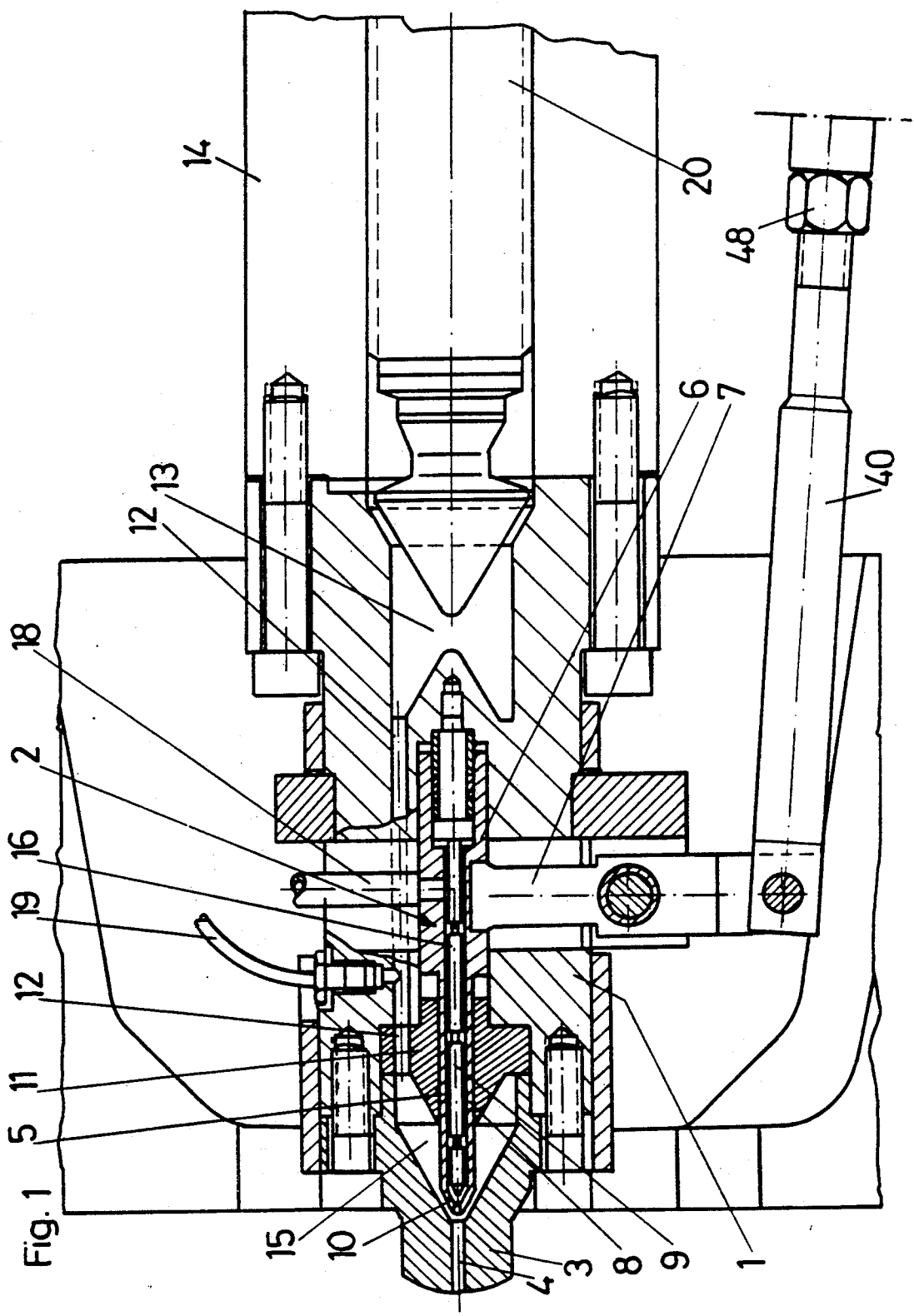
FIG. 1 is a longitudinal sectional view through an injection molding die according to the present invention.
Figure 2:
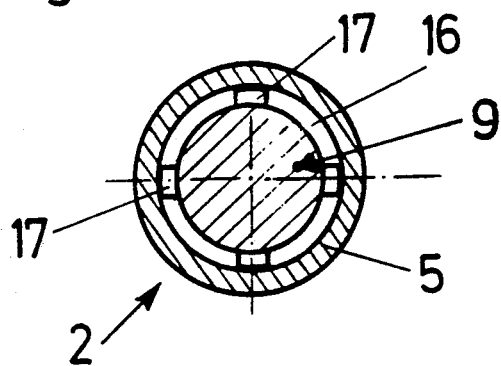
FIG. 2 is a transverse sectional view of the sleeve element and the pin.

Referring to FIGS. 1 and 2, the injection molding die according to the present invention comprises a die base 1 in which a sleeve element 2 is arranged for axial displacement. In front, the die base 1 is provided with a die head 3 having an injection aperture 4.

The sleeve element 2 comprises a narrower or small diameter front zone 5 and a thicker or large diameter rear zone 6. A lever 7 has one end which engages thicker zone 6. Lever 7 is pivotally mounted with respect to base 1 and has an opposite end connected to a linkage 40 which is movable parallel to its own axis to pivot lever 7 and thus move sleeve element 2 axially.

Figure 6:
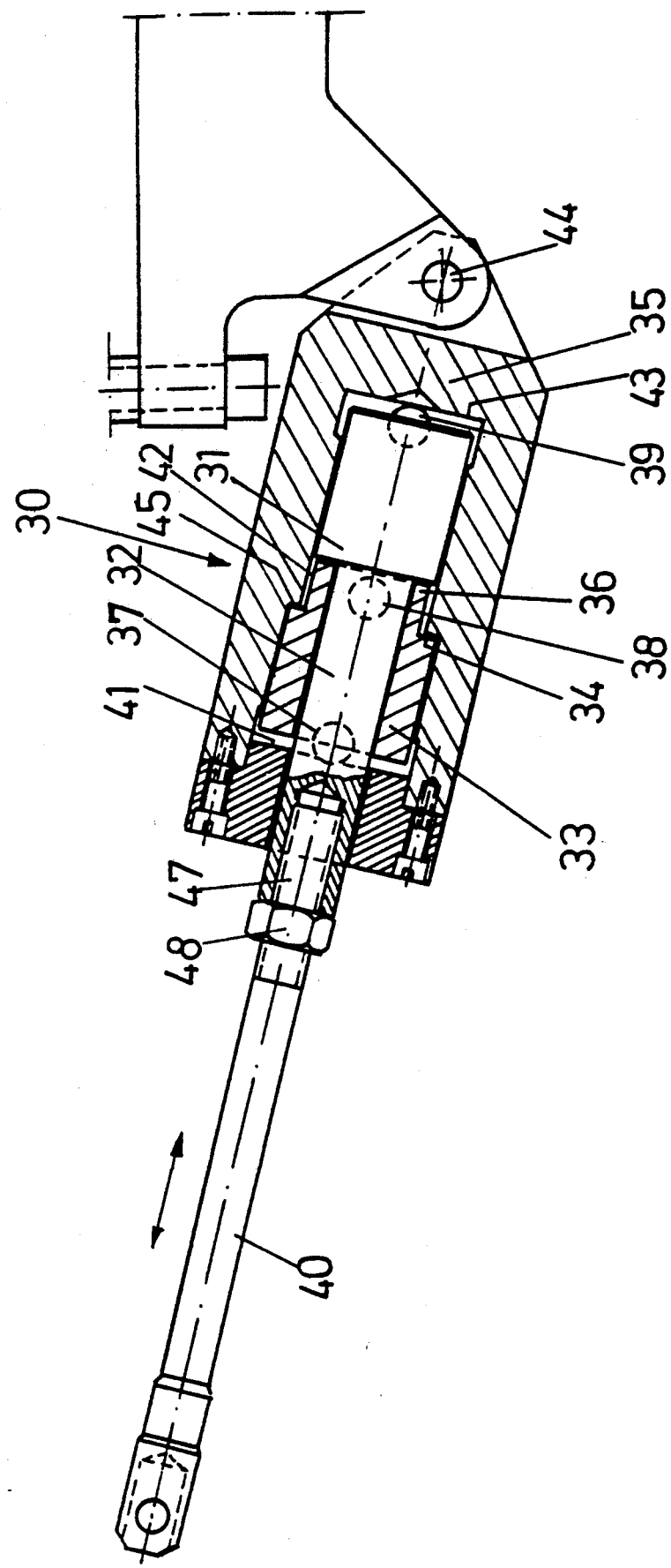
FIG. 6 is a sectional view through an actuating cylinder for moving the sleeve.

Displacement of the sleeve element 2 occurs through a hydraulic cylinder unit 30 shown in FIG. 6. The linkage 40 is connected through a piston rod 32 to a piston 31 contained in the cylinder 35 of the cylinder unit 30. The piston rod 32 and piston 31 are advantageously made of one piece of material.

The cylinder 35 further contains a stop piston 33 which is designed as an annular piston that surrounds the piston rod 32.

At one end, the stop piston 33 is provided with a narrower or small diameter projection 36, whereby an annular shoulder 34 is formed. A stop ring 45 is formed in the cylinder 35 to engage annular shoulder 34.

The cylinder 35 has three connecting openings 37, 38, 39. If linkage 40 is to be moved to the left in FIG. 6, pressure oil enters the cylinder 35 via the connecting opening 39. Piston 31 is thereby moved to the left and pushes the stop piston 33 forward until movement of the sleeve element 2 on a pin 9 is stopped as will be explained later, whereby the excursion of piston 31 is limited. Due to the deflection of lever 7, the sleeve element 2 is now in its rearmost position. So that the sleeve element 2 will always shut off securely, the pistons 31, 33 are always spaced from the cylinder bottoms 41, 43 even in their end positions.

When the sleeve element 2 is to be brought into its frontmost position, that is, when linkage 40 is to be moved to the right, hydraulic fluid is admitted through the connecting opening 38 into the cylinder 35, while at the same time the hydraulic fluid present in front of piston 31 can flow out again through the connecting opening 39. The hydraulic fluid entering the connecting opening 38 first enters an annular channel 42 formed by the projection 36 and the cylinder wall and then pushes the piston 31 to the right. The piston rod 32 is now in its extreme right position and the sleeve element 2 is in the extreme left, i.e. front, position.

To bring the sleeve element 2 into a precisely defined middle position, hydraulic fluid is pumped through the connecting opening 37 into cylinder 35 and simultaneously hydraulic fluid is let out through the connecting openings 38 and 39. The stop piston 33 is now moved to the right, until it abuts by its annular shoulder 34 against the corresponding stop ring 45 of cylinder 35. Thereby piston 31 is brought into a fixed intermediate position in the cylinder 35. The linkage 40 connected to the piston 31 is thereby held exactly in a given middle position during this operation and thus the exact position of the sleeve element 2 is ensured.

The adjustment of the two end positions of piston 31 and of stop piston 33 occurs through threads 47 of linkage 40 and a lock nut 48. The cylinder 35 is preferably mounted by means of a joint 44 at the injection cylinder clamp of the machine.

The sleeve element 2 has a central pin channel 8, into which the closing pin 9 protrudes. The closing pin 9 is arranged to be rigid relative to the die base 1.

At its front end, the sleeve element 2 is in the form of a cap and has a passage opening 10. Its narrower front zone 5 is guided in a guide member 11 which has passage channels 12 for the plasticized plastic. The passage channels 12 lead also through the die base 1 and thus connect the rear die chamber 13, which is directly adjacent a screw cylinder 14, with a front die chamber 15, which is delimited by the die head 3 and the guide member 11.

Since the diameter of the closing pin 9 is smaller than the diameter of channel 8 of the sleeve element 2, there is an annular gap 16 between the closing pin 9 and the sleeve element 2.

To improve the guiding of the sleeve element 2 on the closing pin 9, the closing pin 9 is provided with lateral guiding knobs 17, along which the sleeve element 2 is guided. As can be seen from FIG. 2, the knobs 17 surround the closing pin 9 in star form and thus do not hinder the passage of a gas.

A movable gas feed line 18 opens laterally into the sleeve element 2. Thus the gas feed line 18 can participate in the axial movement of the sleeve element 2.

One of the channels 12 has a pressure sensor 19 protruding into it. In the embodiment shown, six passage channels 12 are provided, but the invention is not limited to this number.

When the sleeve element 2 is in its right (rear) end position, the tip of the closing pin 9 shuts the passage opening 10 of the sleeve element 2 and at the same time the injection aperture 4 is cleared. Under the pressure exerted by a screw 20 in screw cylinder 14, plasticized plastic can now get from the die chamber 13 via the passage channels 12 into the front die chamber 15 and can escape thence via the injection aperture 4 into an injection mold (not shown).

When the sleeve element 2 is brought into its extreme left position, i.e. the front end position, its front end closes off the injection aperture 4 from the front die chamber 15. Now a gas, in particular nitrogen, can be blown via the gas feed line 18 and further via the annular gap 16 through the opening 10 and injection aperture 4 into the molding tool (die).

In the embodiment shown, the excursion of the pin is only six millimeters, so that very quick switching from plastic injection to gas injection is possible.

In the middle position shown in FIG. 1, the simultaneous injection of plastic and gas into the mold is possible.

Figure 3:
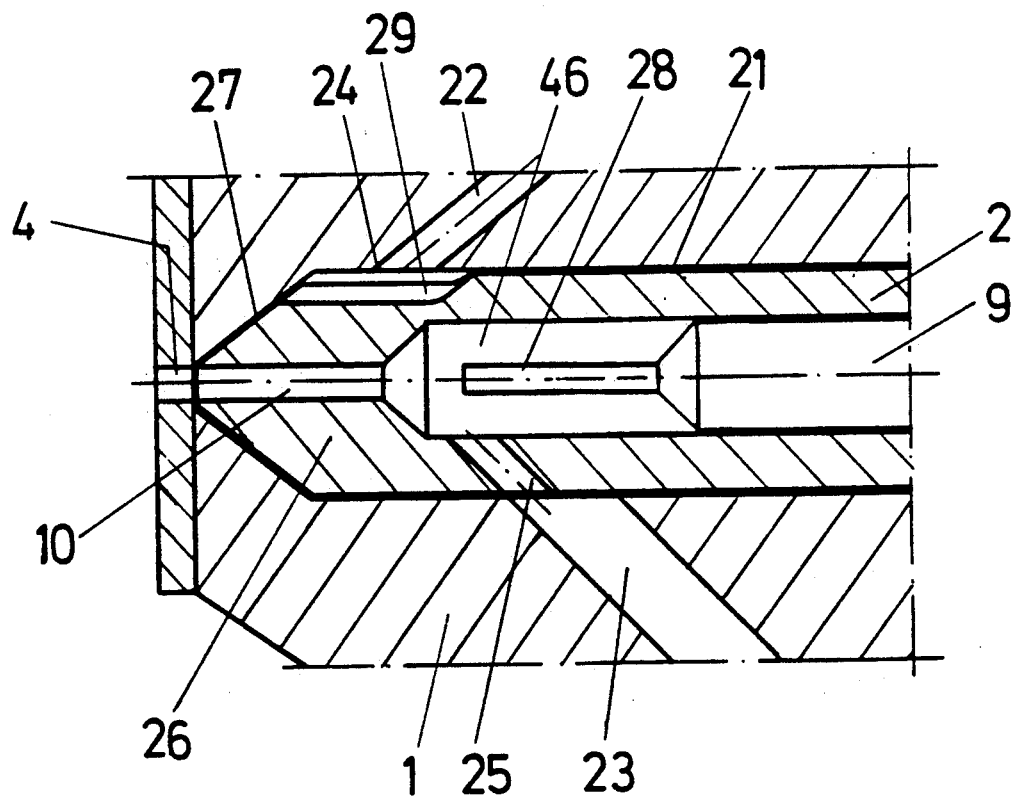
FIGS. 3, 4 and 5 are longitudinal sectional views through further embodiments of the invention, the sleeve element being shown in three possible operating positions.
Figure 4:
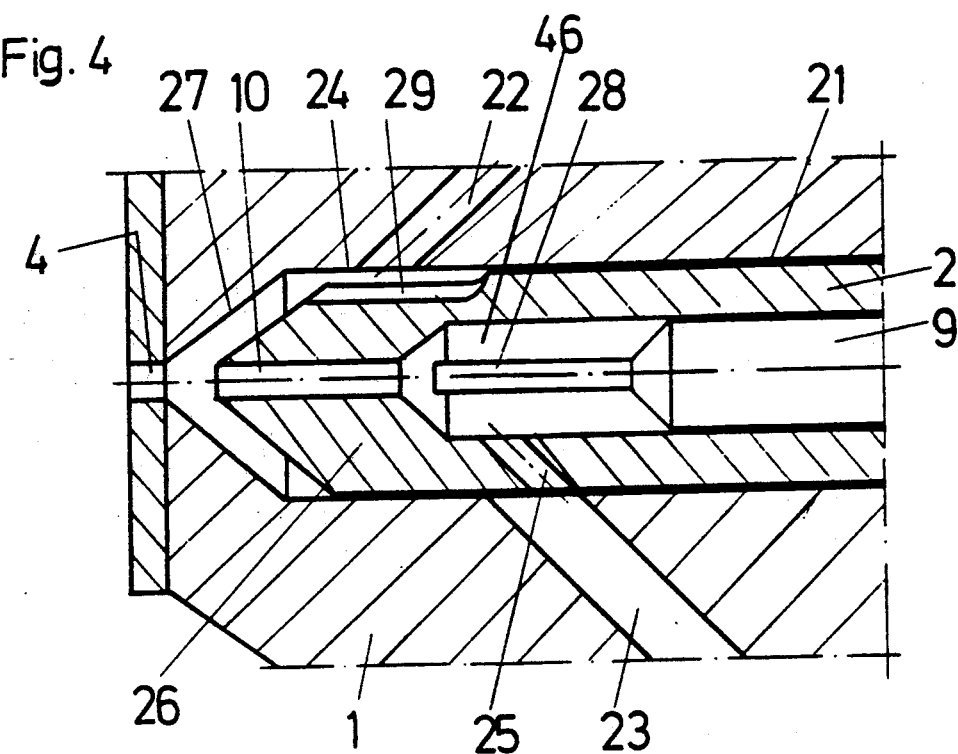
Figure 5:
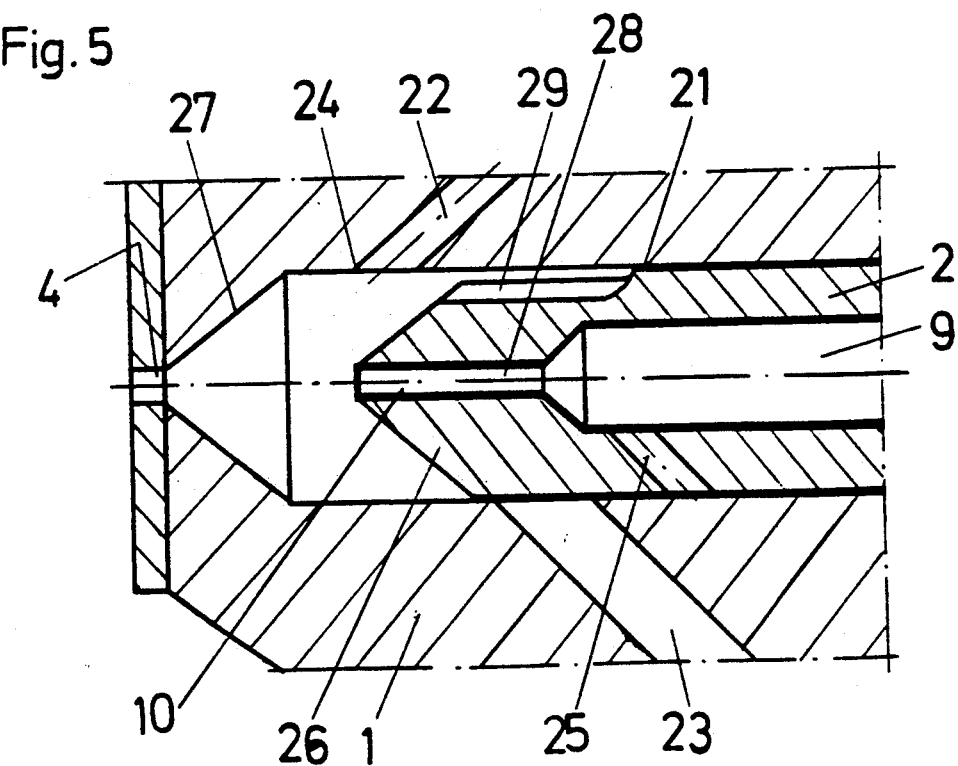

FIGS. 3 to 5 show a further embodiment of the invention which is suitable in particular for injecting two plastic components and where the same reference numerals are used to designate the same or similar parts. Again the injection molding die has a die base 1 and a sleeve element 2 guided therein for axial displacement. Again a closing pin 9 protrudes into the sleeve element 2, but this time the closing pin 9 is guided in the sleeve element 2 with close fit, i.e. there is no annular channel between the closing pin 9 and the sleeve element 2.

Opening into the die channel 21, into which the sleeve element 2 is guided, are two side channels 22, 23, which are connected to injection cylinders in a conventional manner.

Here the outlet openings or passages 24, 25 of the side channels 22, 23 are offset with respect to each other in the displacement direction of the sleeve element 2, so that the outlet 24 is closer to the injection aperture 4 than is the outlet 25.

The front end of tip 26 of the sleeve element 2 is conical and again has a passage opening 10. At the injection aperture 4 a conical seat 27 matching the front end or tip 26 of the sleeve element 2 is machined, so that in its front position the sleeve element 2 is applied against it fully and under seal.

When the sleeve element 2 is in the position shown in FIG. 3, the front side channel 22 is closed and a plastic component can be injected through the side channel 23 into a sleeve channel 46 and through the opening 10 and the injection aperture 4 into the molding tool.

The opposite position is shown in FIG. 5. Here the side channel 23 or respectively its outlet 25 is covered by the convex surface of the sleeve element 2, and the tip 26 of the sleeve element 2 is located behind the outlet opening 24 of the side channel 22. Plastic material of a second component can now be injected via the side channel 22, the die channel 21 and the injection aperture 4 into the molding tool. A cylindrical shank 28 of pin 9 protrudes into the opening 10 and ejects any plastic residues that may be present therein.

FIG. 4 shows a middle position which permits parallel injection of both plastic components. In this case, both outlet openings 24, 25 of the side channels 22, 23 are cleared at least in part, and also the opening 10 is clear.

To make parallel injection possible, the sleeve body 2 has on its convex surface a notch 29 which is located in the region of the outlet opening 24 of the upper side channel. Plasticized plastic thus passes from the side channel 22 over the notch 29 into the cavity which is defined by the tip 26 of the sleeve element 2 and the wall 27 of the die channel 21.

While specific embodiments of the invention have been shown and described in detail to illustrate the application of the principles of the invention, it will be understood that the invention may be embodied otherwise without departing from such principles.

What is claimed is:

1. An injection molding die of an injection molding machine for injection of a plurality of components to form an injection molded piece, comprising:
   a die base (1) having a die channel (21) therein with an injection aperture (4) in said die base, said injection aperture communicating with said die channel;
   a sleeve element (2) axially displaceable in the die channel, the sleeve element having a pin channel (8) therein with a passage opening (10) in said sleeve element, said passage opening communicating with said pin channel;
   a fixed closing pin (9) protruding into the pin channel of the sleeve element, the closing pin having a tip for closing the passage opening and being fixed to the die base at a constant distance from the injection aperture; and
   drive means connected to the sleeve element for displacing the sleeve element in a direction of movement over the constant distance between the injection aperture and the tip of the closing pin, said sleeve element having a forward position adjacent the injection aperture, an intermediate position with the sleeve element spaced from the injection aperture and with the tip of the closing pin closing the passage opening, said drive means comprising a piston rod (32) connected to the sleeve element, a main piston (31) fixed to said piston rod, a stop piston (33) axially movable along said piston rod, a cylinder (35) defining a cylinder space containing said stop piston and said main piston, said cylinder having a first opening (37) at one end of said space, a second opening (38) at an intermediate location along said space and a third opening (39) at an opposite end of said space, said first, second and third openings operating to admit fluid into said space for moving said stop piston and said main piston, said stop piston having a stop ring and said cylinder defining an annular shoulder for engagement by said stop ring, said second opening being located near said annular shoulder for admitting fluid into said space and for moving said main piston toward the opposite end of said space for bringing said sleeve element into said forward position, fluid being supplied to said third opening moving said stop piston and said main piston toward the one end of said space for moving said sleeve element into its rearward position, and fluid supplied to said first opening moving said stop ring of said stop piston against said annular shoulder for moving said sleeve element into said intermediate position.

2. An injection molding die according to claim 1 wherein the closing pin defines an annular gap (16) with the sleeve element in the pin channel, and including a feed line (18) connected to the sleeve element, said feed line communicating with the annular gap for supplying a fluid to the annular gap.

3. An injection molding die according to claim 1 wherein the drive means further comprises a lever moveably mounted to the piston rod and laterally engaged to the sleeve element for moving the sleeve element.

4. An injection molding die according to claim 1 wherein the closing pin defines a gap with the pin channel in the sleeve element, and a plurality of radially extending circumferentially and axially spaced guiding knobs (17) connected to the closing pin and engaged with the sleeve element for guiding movement of the closing pin in the sleeve element.

5. An injection molding die according to claim 1 wherein the closing pin defines an annular gap with the sleeve element in the pin channel, a feed line connected to the sleeve element and communicating with the annular gap for supplying fluid to the annular gap, the feed line extending laterally from the sleeve element and being displaceable with the sleeve element.

6. An injection molding die according to claim 1 including a guide member (11) in the die channel for slidably guiding the sleeve member, the guide member delimiting a front die chamber (15) in the die channel and a plurality of passage channels (12) for plasticized plastic, said passage channels extending through the guide member and communicating with the front die chamber.

7. An injection molding die according to claim 6 wherein the die base includes a rear die chamber (13), the passage channels (12) continuing through the die base for communicating the rear die chamber with the front die chamber, and screw cylinder means communicating with the rear die chamber for supplying plasticized plastic to the rear die chamber.

8. An injection molding die according to claim 1 wherein the drive means includes means for holding the sleeve element in a middle position between the injection aperture and the tip of the closing pin.

9. An injection molding die according to claim 1, including a side channel (23) in said die base communicating with said die channel and wherein the sleeve element includes a lateral passage (25) communicating the side channel with the pin channel, the lateral passage being at a location near the passage opening (10) of the sleeve element.

10. An injection molding die according to claim 9 wherein the die base includes a further side channel (22) communicating with the die channel, said side channel (23) communicating with the lateral passage when the sleeve element is near the injection aperture and the further side channel having an outlet opening (24) which is offset from the lateral passage in the direction of movement of the sleeve element.

11. An injection molding die according to claim 10 wherein the sleeve element includes a recess (29) near the outlet opening (24).

* * * * *